US008866033B2

(12) United States Patent
Xue (10) Patent No.: US 8,866,033 B2
(45) Date of Patent: Oct. 21, 2014

(54) KEY MODULE AND ELECTRONIC DEVICE INCLUDING THE SAME (71) Applicant: Wistron Corporation, New Taipei (TW)

(72) Inventor: Xiang-Lin Xue, New Taipei (TW)

(73) Assignee: Wistron Corporation, New Taipei (TW)

( * ) Notice: Subject to any disclaimer, the term of this patent is extended or adjusted under 35 U.S.C. 154(b) by 211 days.

(21) Appl. No.: 13/680,516

(22) Filed: Nov. 19, 2012

(65) Prior Publication Data
US 2013/0234938 A1 Sep. 12, 2013

(30) Foreign Application Priority Data
Mar. 8, 2012 (CN) .................. 2012 2 0085179 U (51) Int. Cl.
H01H 13/70 (2006.01)
G06F 3/0354 (2013.01)
G06F 1/16 (2006.01)
(52) U.S. Cl.
CPC ............ *G06F 3/03547* (2013.01); *G06F 1/169* (2013.01)
USPC ......................................... 200/343

(58) Field of Classification Search
USPC .......... 200/343, 339, 341, 344; 400/472, 480, 400/491, 491.2
See application file for complete search history.

(56) References Cited

U.S. PATENT DOCUMENTS

| 6,455,794 | B2* | 9/2002 | Sato et al. ...................... 200/344 |
| 6,859,355 | B2* | 2/2005 | Chuang et al. ............. 361/679.1 |
| 7,217,898 | B2* | 5/2007 | Chien et al. ................... 200/339 |
| 8,299,382 | B2* | 10/2012 | Takemae et al. .............. 200/344 |
| 2010/0300772 | A1 | 12/2010 | Lee et al. |

* cited by examiner

*Primary Examiner* — Vanessa Girardi
(74) *Attorney, Agent, or Firm* — Rajesh Vallabh; Foley Hoag LLP (57) ABSTRACT An electronic device includes a case and a key module. The key module is mounted on a supporting surface of a housing of the case and includes: a touch pad, a circuit board, a press switch and a transmission member. The press switch is coupled electrically to the circuit board and is disposed at a position corresponding to the middle of the touch pad in a lengthwise direction. The transmission member is mounted between the circuit board and the supporting surface, and includes two levers and a press member disposed between the levers and abutting against the press switch. A corresponding electrical signal can be produced by abutment of the press member against the press switch linked by the transmission member.

10 Claims, 10 Drawing Sheets

KEY MODULE AND ELECTRONIC DEVICE INCLUDING THE SAME

CROSS-REFERENCE TO RELATED APPLICATION

This application claims priority of Chinese Patent Application No. 201220085179.1, filed on Mar. 8, 2012, the disclosure of which is incorporated herein by reference.

BACKGROUND OF THE INVENTION

1. Field of the Invention

The invention relates to a key module, more particularly to a key module having a transmission member and an electronic device including the key module.

2. Description of the Related Art

Figure 1:
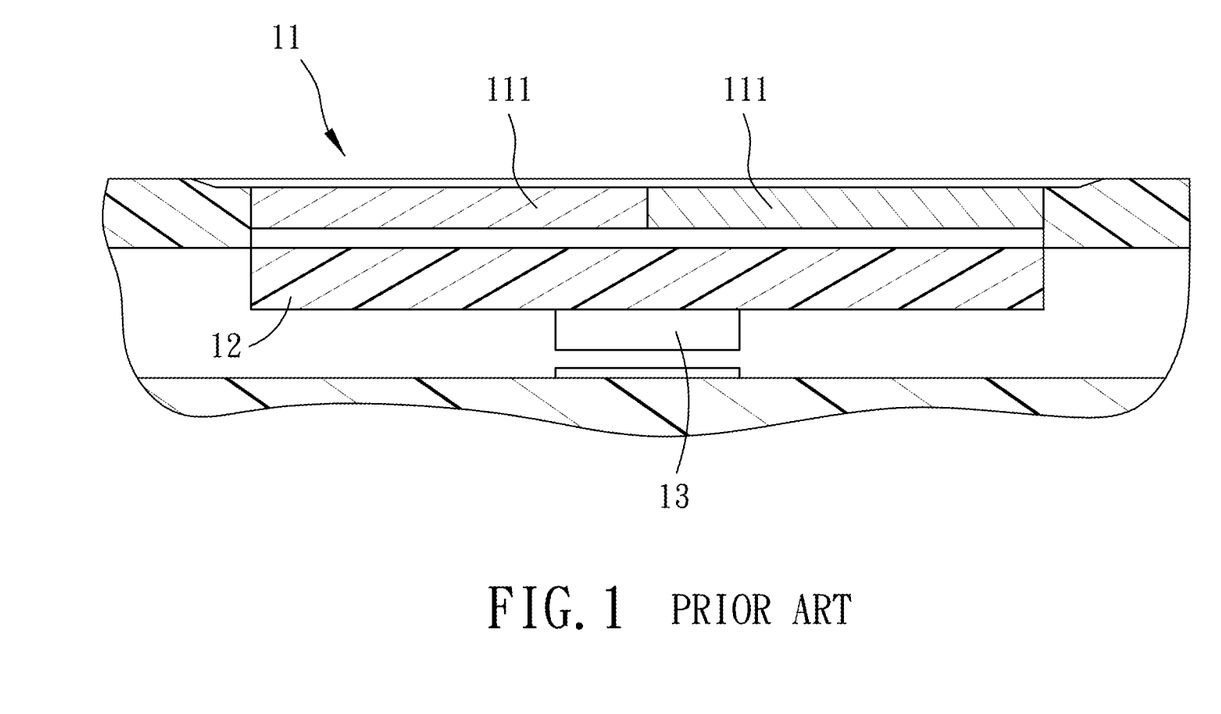
FIG. 1 is a fragmentary sectional schematic view of a conventional key module.

A laptop computer is generally provided with a touch pad that replaces a computer mouse and is combined with two buttons side by side that respectively replace left and right buttons of the computer mouse. Referring to FIG. 1, a conventional key module includes a touch pad 11, a circuit board 12 mounted underneath the touch pad 11 and a press switch 13 mounted underneath the circuit board 12. The press switch 13 is disposed at a position corresponding to the middle of the touch pad 11 in a lengthwise direction, and divides the touch pad 11 into left and right push portions 111. When a user's finger pushes one of the push portions 111, a pressure is put on the press switch 13, and the touch pad 11 senses whether the left or right push portion 111 is subjected to the push and then produces the corresponding electrical signal. Consequently, the conventional key module integrates functions of the touch pad 11 and the left and right push portions 111 together.

However, since the edge portions respectively close to the left side of the left press portion 111 and the right side of the right push portion 111 are relatively distant from the press switch 13, it is difficult for the user to apply a force on the press switch 13 through pushing the edge portions and for the press switch 13 to sense whether or not a pressure is applied thereon.

SUMMARY OF THE INVENTION

Therefore, one object of the present invention is to provide a key module having a press switch for which the problems of requiring a relatively large pushing force and of the difficulty to recognize a push at a position distant from the press switch are absent.

Therefore, according to this invention, a key module adapted to be mounted in a housing having a supporting surface includes a touch pad, a circuit board, a press switch and a transmission member.

The touch pad is disposed above the supporting surface. The circuit board is mounted between the touch pad and the supporting surface. The press switch is coupled electrically to the circuit board and faces the supporting surface, and is disposed at a position corresponding to the middle of the touch pad in a lengthwise direction. The transmission member is mounted between the circuit board and the supporting surface, and includes two levers and a press member disposed between the two levers and abutting against the press switch. Each lever has an effort arm, a resistance arm connecting the press member and the effort arm, and a fulcrum formed between the effort arm and the resistance arm and abutting against the supporting surface. By means of putting a pressure on a portion of the touch pad that corresponds to the effort arm of the corresponding one of the levers so as to exert a force on the effort arm, the corresponding resistance arm is acted the fulcrum to shift toward the touch pad and bring the press member to abut against the press switch and to generate a corresponding electrical signal.

Another object of this invention is to provide an electronic device that includes a key module.

Therefore, the electronic device according to this invention includes a case and a key module.

The case includes a housing and a cover body. The housing has a supporting surface.

The key module is mounted on the housing and includes a touch pad, a circuit board, a press switch and a transmission member.

The touch pad is exposed from the housing and is disposed above the supporting surface. The press switch is coupled electrically to the circuit board, faces the supporting surface, and is disposed at a position corresponding to the middle of the touch pad in a lengthwise direction. The transmission member is mounted between the circuit board and the supporting surface, and includes two levers and a press member disposed between the two levers and abutting against the press switch. Each lever has an effort arm, a resistance arm connecting the press member and the effort arm, and a fulcrum formed between the effort arm and the resistance arm and abutting against the supporting surface. By means of putting a pressure on a portion of the touch pad that corresponds to the effort arm of the corresponding one of the levers so as to exert a force on the effort arm, the corresponding resistance arm is acted by the fulcrum to shift toward the touch pad and bring the press member to abut against the press switch so as for the press switch to generate a corresponding electrical signal.

The effect of this invention resides in that, when the user exerts a force on the touch pad at a position relatively distant from the press switch, i.e., at one of the short sides, by means of lever action of the transmission member to bring the corresponding one of the levers of the transmission member to abut against the press switch, not only can the magnitude of the needed pushing force for actuating the press switch be significantly reduced, but the user's feeling of pushing the press switch is also improved.

BRIEF DESCRIPTION OF THE DRAWINGS

Other features and advantages of the present invention will become apparent in the following detailed description of the embodiment of this invention, with reference to the accompanying drawings, in which.

DETAILED DESCRIPTION OF THE PREFERRED EMBODIMENT

The above-mentioned and other technical contents, features, and effects of this invention will be clearly presented in the following detailed description of one embodiment in coordination with the reference drawings.

It is particularly noted herein that directional terminologies, such as top, bottom, left, right, front and rear, as used herein are defined in relation to the drawings, and are intended to facilitate description of the present invention rather than limit the scope of the present invention.

Figure 2:
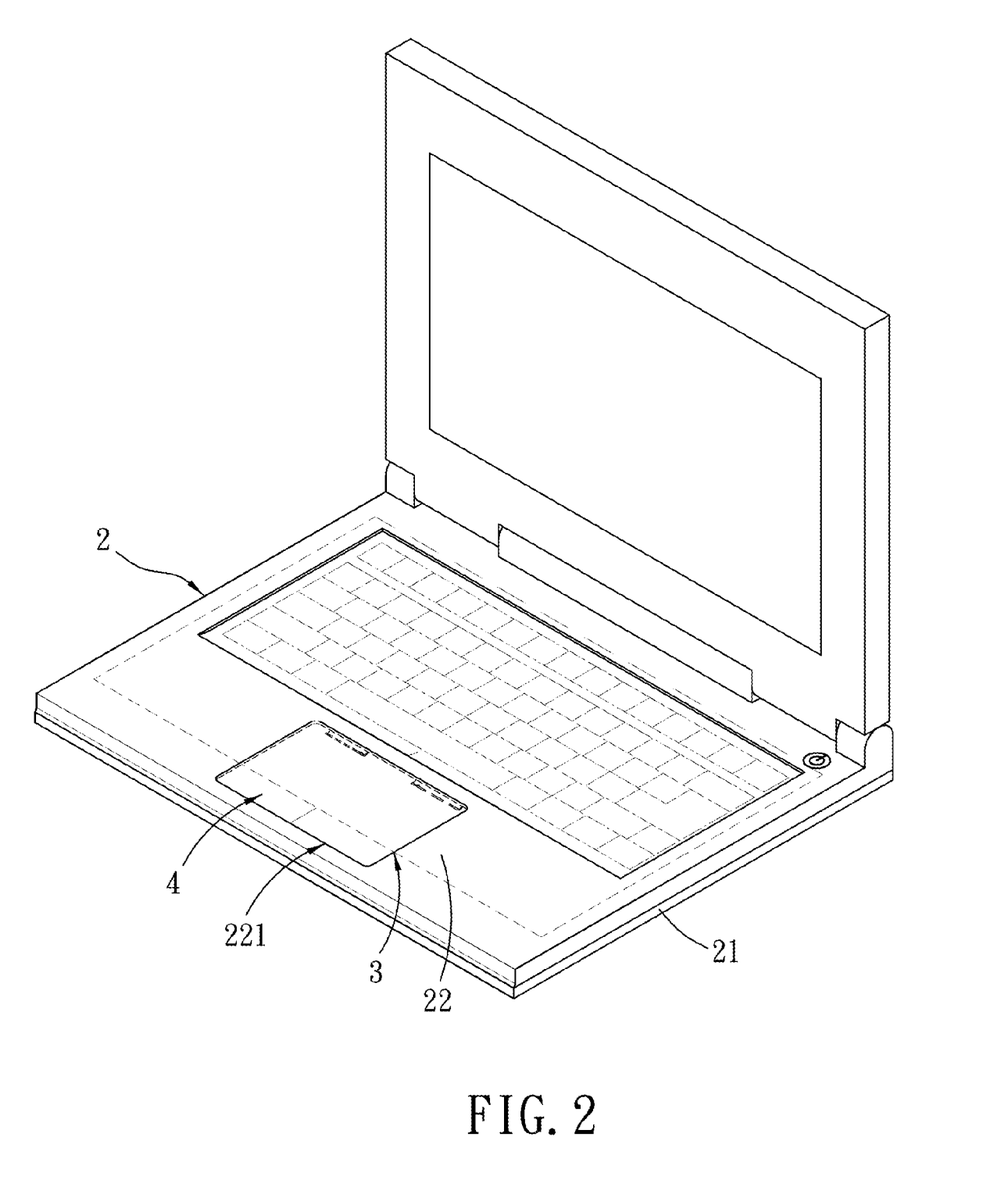
FIG. 2 is a perspective view of the embodiment of an electronic device according to the present invention.

As shown in FIG. 2, the embodiment of an electronic device with a key module according to the present invention takes a notebook computer as an example. The electronic device includes a case 2 and a key module 3.

Referring to FIGS. 2 to 5, the case 2 includes a housing 21, a cover body 22 and two engaging hooks 23. The housing 21 has a supporting surface 211. The cover body 22 is formed with a rectangular opening 221. The engaging hooks 23 protrude from the cover body 22 and separately extend along a long side 222 of a periphery defining the rectangular opening 221. Each of the engaging hooks 23 is an elongated plate with an arc cross section and is formed with an engaging groove 24.

The key module 3 is mounted on the housing 21 and includes a touch pad 4, a circuit board 5, a press switch 6, a fixed plate 7, an adhesive layer 8 and a transmission member 9.

Figure 3:
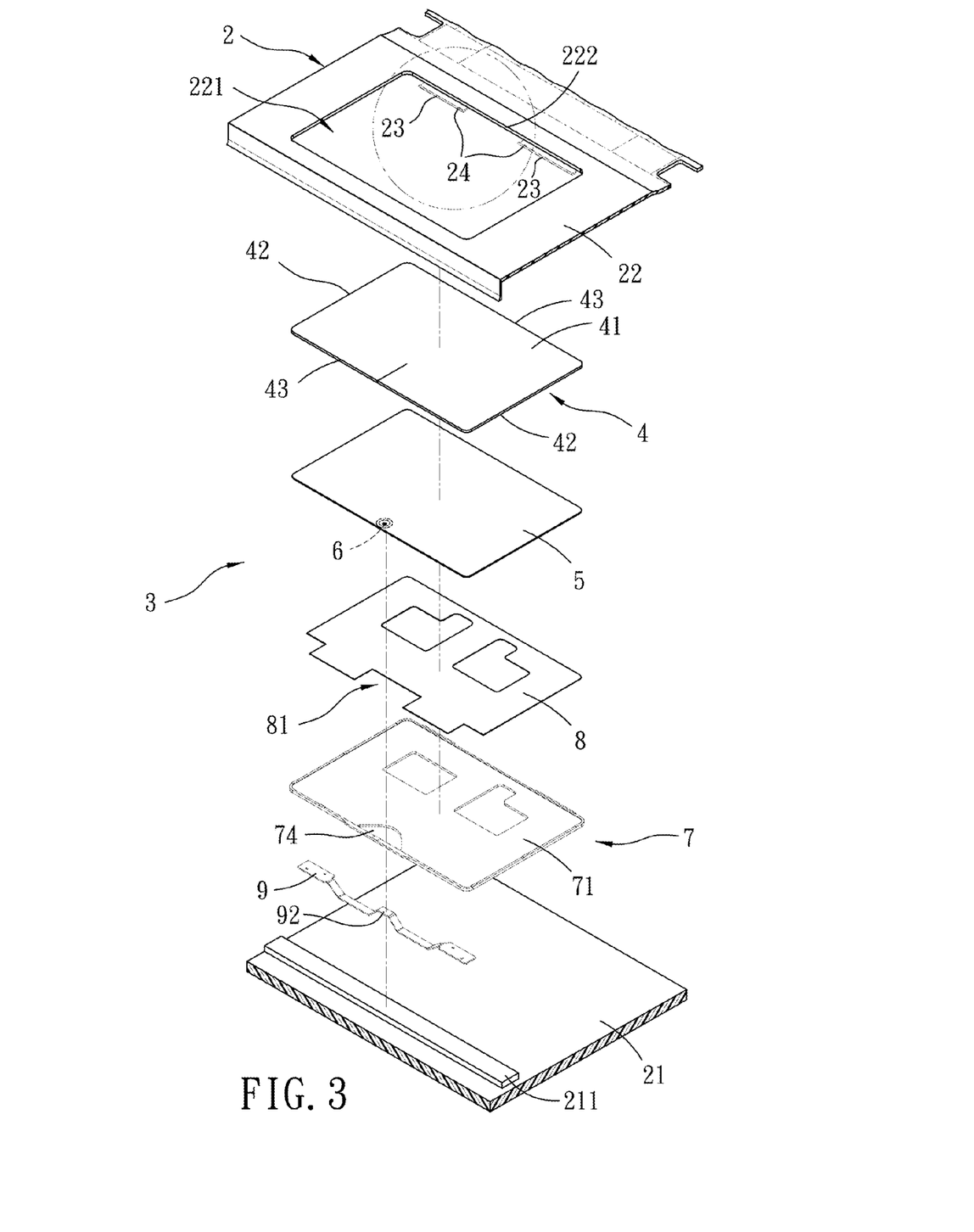
FIG. 3 is an exploded perspective view of a key module of the electronic device of the embodiment, wherein only part of a case of the embodiment of FIG. 2 is shown.
Figure 4:
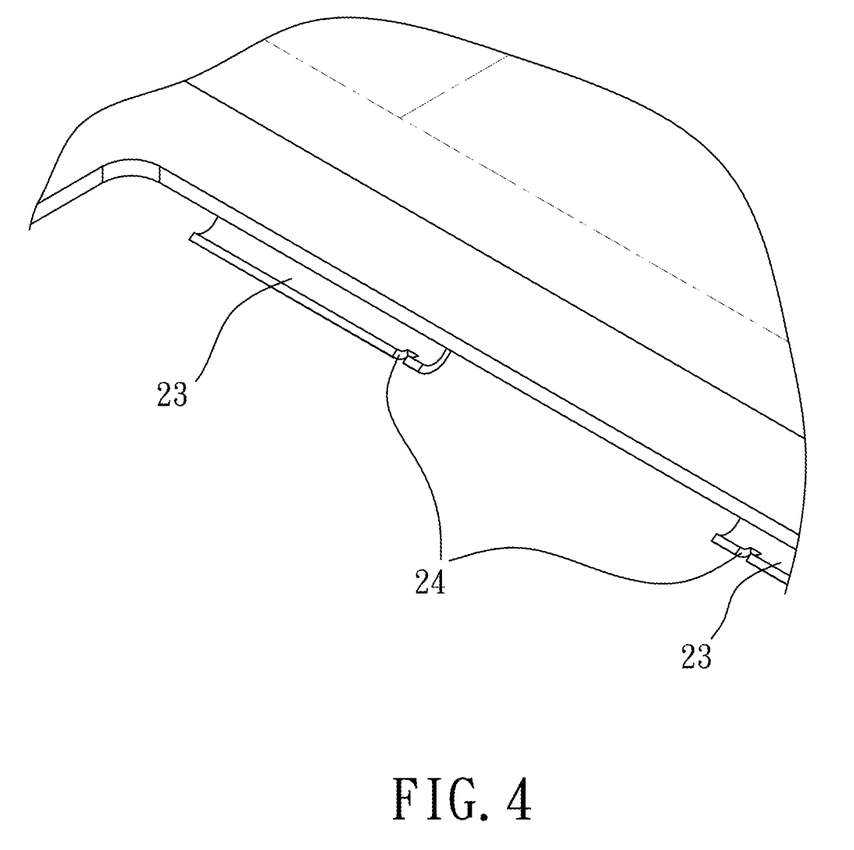
FIG. 4 is a partially enlarged perspective view of a circle portion of FIG. 3 for illustrating an engaging hook and an engaging groove of a cover body of the embodiment of FIG. 2.
Figure 5:
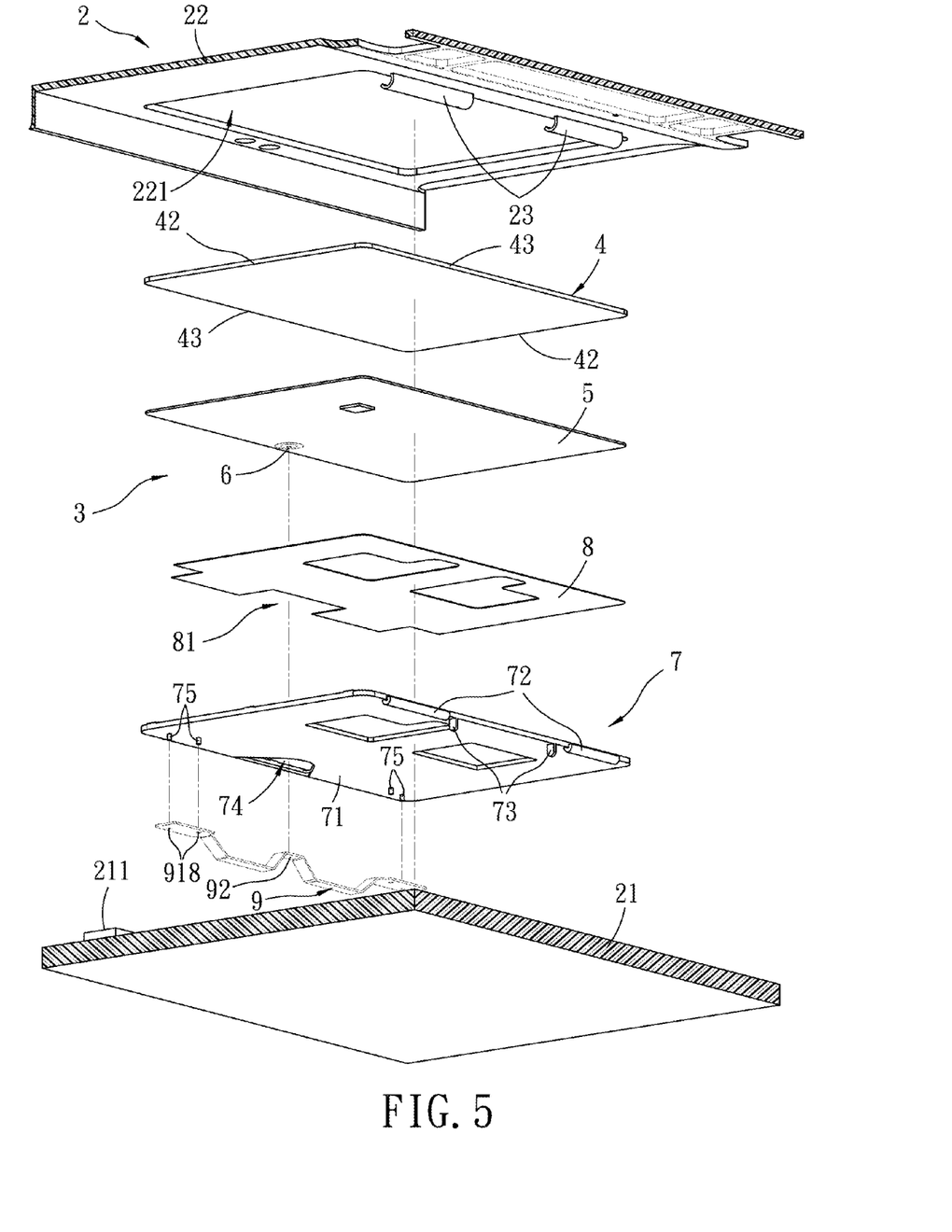
FIG. 5 is an exploded perspective view of the electronic device of the embodiment of FIG. 2 taken from a viewing angle different from that of FIG. 3.

The touch pad 4 is disposed above the supporting surface 211. The touch pad 4 has a top-view contour of a rectangular plate body 41 that has a pair of short sides 42 and a pair of long sides 43, each interconnecting the short sides 42. The touch pad 4 may be made from glass or a resin, such as matpolymethylmethacrylate (abbreviated as PMMA), so as to enhance its strength.

The circuit board 5 is mounted between the touch pad 4 and the supporting surface 211. The circuit board 5 also has a top-view contour of a rectangular plate body. In this embodiment, the circuit board 5 utilizes change in capacitance values to detect a touch point on the touch pad 4 triggered by a subject. This sort of technology is well known for those skilled in the art, and the details thereof are omitted here for sake of brevity. However, detection of the touch point is not limited to the use of the changes in capacitance values. The press switch 6 is disposed on the circuit board 5, faces the supporting surface 211, and is disposed at a position corresponding to the middle of the touch pad 4 in a lengthwise direction. In this embodiment, the press switch 6 is disposed at a position proximate to one of the long sides 43 of the touch pad 4.

Figure 6:
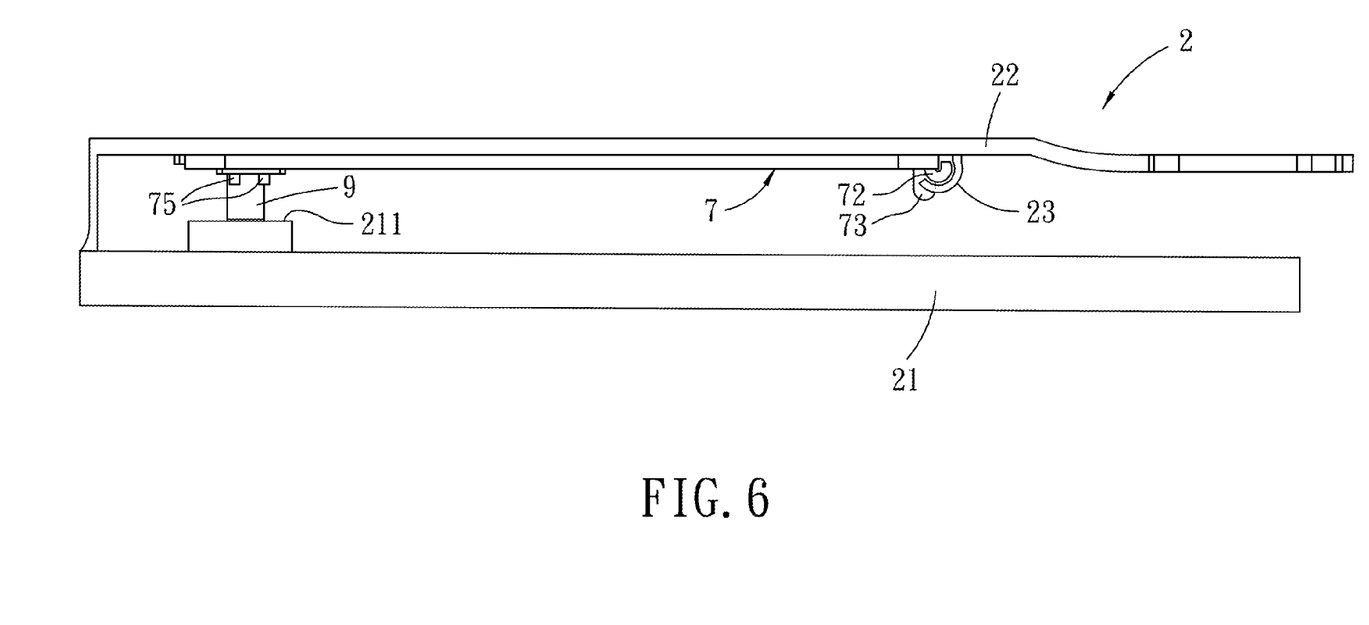
FIG. 6 is a side view of the embodiment of FIG. 2, where only part of the structure of the case is shown.
Figure 8:
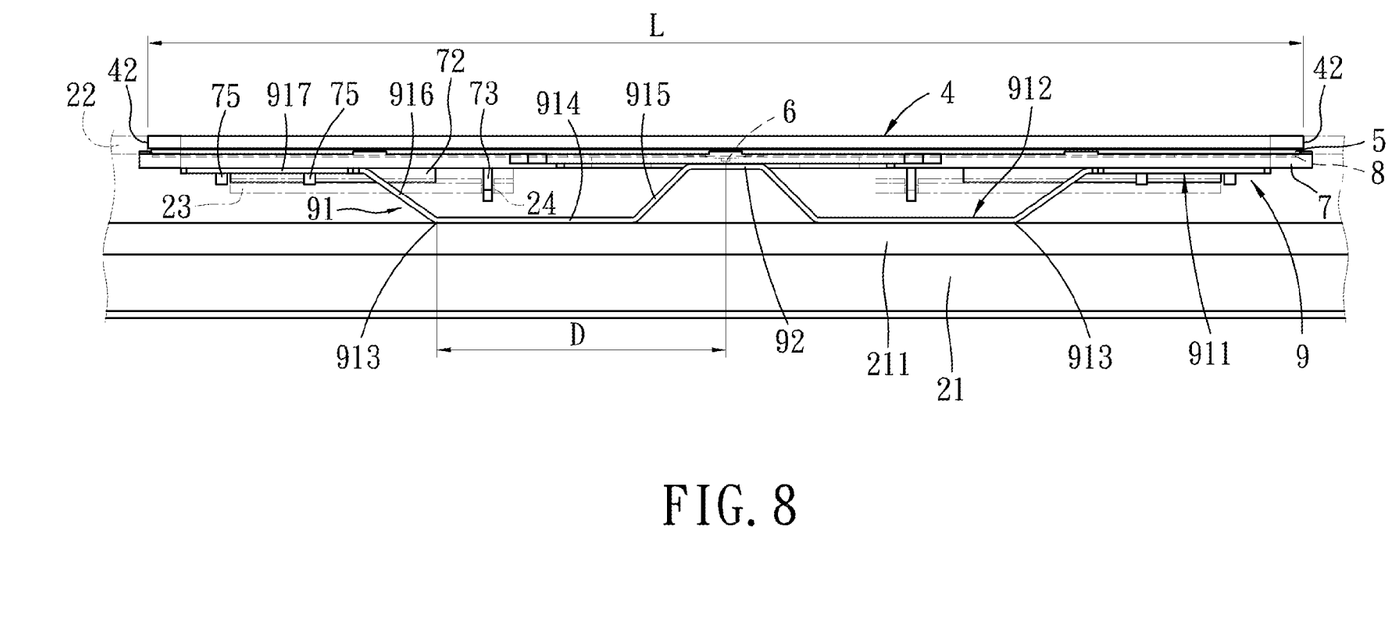
FIG. 8 is a fragmentary side schematic view of the embodiment of FIG. 2 to illustrate a touch pad that is pushed.

Referring to FIGS. 5, 6 and 8, the fixed plate 7 is connected to the circuit board 5 through the adhesive layer 8. Hence, the touch pad 4, the circuit board 5, the adhesive layer 8 and the fixed plate 7 are stacked one another in order. Preferably, the fixed plate 7 is made from a rigid material so as to enhance the structural strength thereof. The fixed plate 7 has a top-view contour of a rectangle board body 71, two engaging members 72 separately protruding from a long side of the board body 71 and two plate-shaped stoppers 73 that also separately protrude from the long side of the board body 71 and that are interposed between the two engaging members 72. Each of the engaging members 72 is received in a corresponding one of the engaging hooks 23 so that the long side of the board body 71 is not movable up and down relative to the cover body 22. Besides, the plate-shaped stoppers 73 are respectively engaged with the engaging grooves 24 (see FIG. 4) of the engaging hooks 23, so that the fixed plate 7 does not shake around relative to the cover body 22, and in such a manner, the fixed plate 7 can be fixed on the cover body 22.

Figure 7:
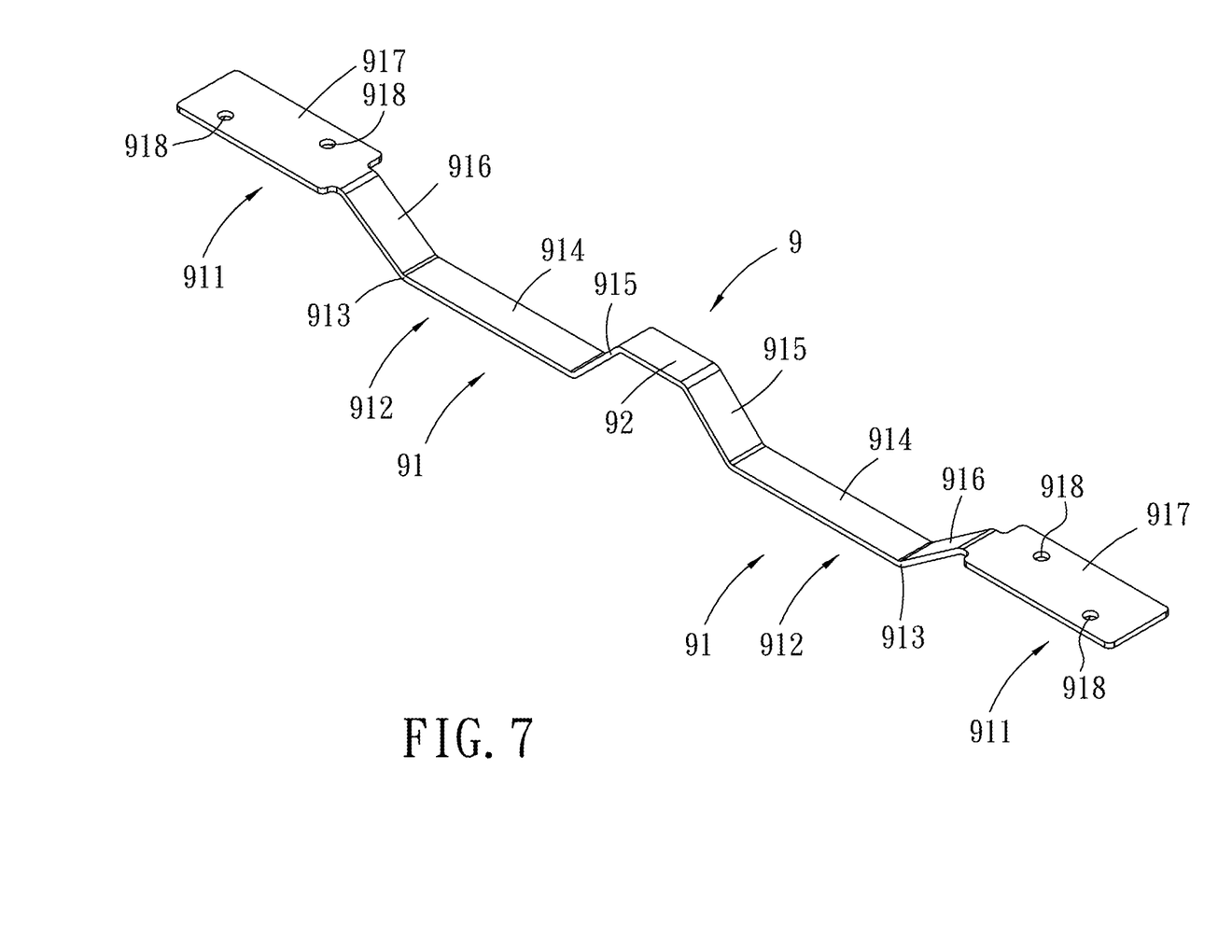
FIG. 7 is a perspective view of a transmission member of the key module of the embodiment of FIG. 2.

Referring to FIGS. 3, 7 and 8, the transmission member 9 is positioned between the fixed plate 7 and the supporting surface 211. The transmission member 9 includes two levers 91, and a press member 92 that is disposed between the two levers 91 and that abuts against the press switch 6. Each of the levers 91 includes an effort arm 911, a resistance arm 912 that connects the press member 92 and the effort arm 911, and a fulcrum 913 that abuts against the supporting surface 211 and that is formed between the effort arm 911 and the resistance arm 912. Moreover, the fixed plate 7 is formed with an opening 74 and the adhesive layer 8 is formed with a notch 81 aligned with the opening 74 of the fixed plate 7 so that the press switch 6 extends through the notch 81 and the opening 74 and so that the press member 92 directly abuts against the press switch 6. Referring to FIGS. 5, 7 and 8, specifically, the transmission member 9 is made of a bent resilient metal piece. The resistance arm 912 of each lever 91 includes a flat segment 914 and a first connecting segment 915, and the effort arm 911 includes a second connecting segment 916 and a force receiving segment 917. The flat segment 914 is flatly disposed on the supporting surface 211. The first connecting segment 915 connects the flat segment 914 and the press member 92. The second connecting segment 916 connects the flat segment 914 and the force receiving segment 917. The first connecting segment 915 and the second connecting segment 916 respectively and inclinedly extend from two opposite ends of the flat segment 914 in directions departing from the supporting surface 211 such that the press member 92 and the force receiving segment 917 are spaced apart from the supporting surface 211. The fulcrum 913 is located at a junction between the flat segment 914 and the second connecting segment 916. Moreover, the force receiving segment 917 is formed with two positioning holes 918. The fixed plate 7 further includes four studs 75 respectively registered with the positioning holes 918 of the force receiving segments 917. Through respective extension and fixation of the studs 75 in the positioning holes 918, the fixed plate 7 may be fixed and supported by the transmission member 9. Furthermore, by means of operations of the engaging members 72 and the stoppers 73, the fixed plate 7 may be fixed on the cover body 22 and support the touch pad 4 so that the touch pad 4 is disposed in a position corresponding to the opening 221, and is exposed from the cover body 22 for user input (as shown in FIG. 2).

In the following, a transmission relationship of making the transmission member 9 push the press switch 6 when the touch pad 4 is pushed is illustrated. It should be noted herein that, FIG. 9 and FIG. 10 illustrate only half of the touch pad 4 and half of the transmission member 9, because the other halves of the touch pad 4 and the transmission member 9 are the same.

Figure 9:
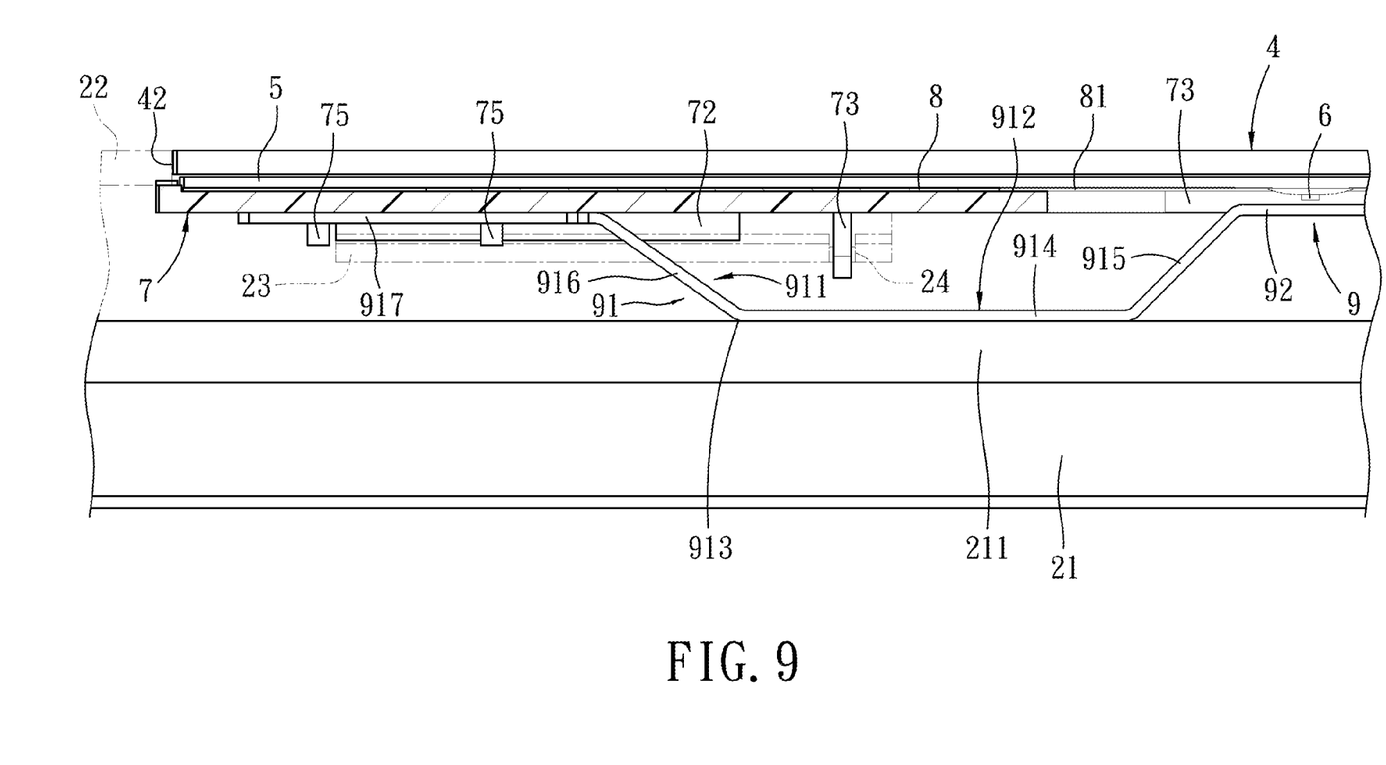
FIG. 9 is a fragmentary side schematic view of the embodiment of FIG. 2 for illustrating the touch pad when not pushed.
Figure 10:
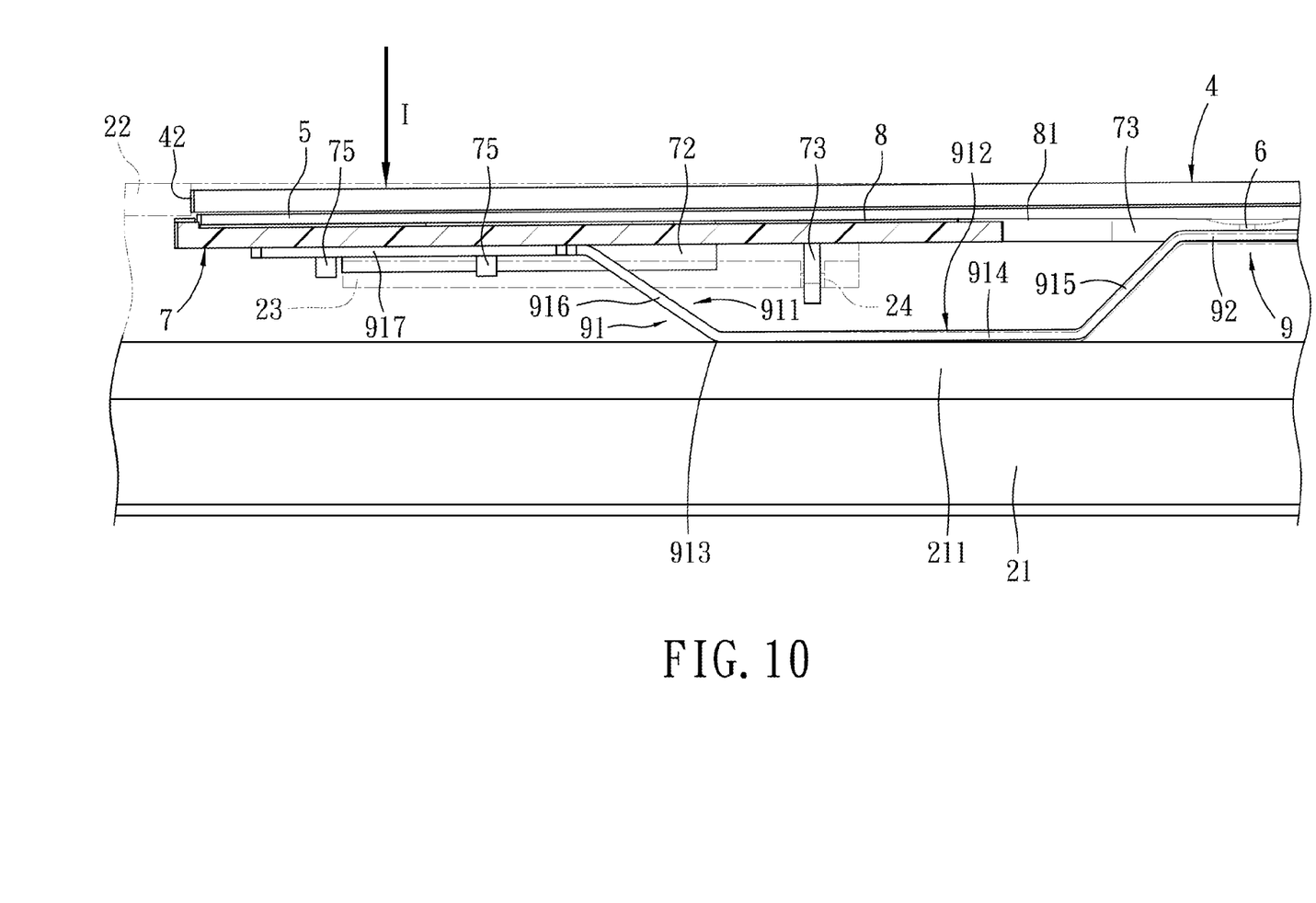
FIG. 10 is a fragmentary side schematic view of the embodiment of FIG. 2 for illustrating transmission motion of the transmission member of the key module of the embodiment of FIG. 2 when the touch pad is pushed at its edge-neighboring portion.

Referring to FIG. 9, the touch pad 4 is in an unloaded state. Referring to FIG. 10, when a region of the touch pad 4 proximate to the short side 42 corresponding to the effort arm 911 of one of the levers 91 is subjected to a force in a direction as shown by the arrow (I) in FIG. 10, the touch pad 4 exerts a corresponding force upon the force receiving segment 917 of the effort arm 911, so that the corresponding resistance arm 912 is forced by the fulcrum 913 to shift toward the touch pad 4, thereby bringing the press member 92 to push the press switch 6 as to generate a corresponding electrical signal. That is, even if a user pushes the touch pad 4 at regions proximate to the short sides 42 that are relatively distant from the press switch 6, the magnitude of the needed pushing force for actuating the press switch 6 does not need to be much greater by virtue of the action of the levers 91 of the transmission member 9 so that the convenience in a push operation is enhanced. In the mean time, the user can also have a tactile feeling of the press. On the other hand, when the user exerts a force at a location proximate to the middle of the touch pad 4, i.e., relatively proximate to the press switch 6, the press switch 6 is simply pushed to directly contact the press member 92 and is adapted to perform in a manner similar to the current techniques.

Referring to FIG. 8, moreover, the length of the touch pad 4 is defined as "L", and the respective distance between the press switch 6 and each fulcrum 913 is defined as "D." When the relationship between "L" and "D" is L/3≥D≥L/4, the position of the fulcrum 913 of the corresponding one of the levers 91 falls within an optimal range, so that the lever may effectively move the press member 92 and trigger the press switch 6.

In sum, when the user exerts a force on the touch pad 4 at a position relatively distant from the press switch 6, i.e., proximate to one of the two short sides 42, by linking the action of the corresponding one of the levers 91 of the transmission member 9 with the press member 92 to abut against the press switch 6, not only is the magnitude of the needed pushing force for actuating the press switch 6 significantly reduced, but the user's feeling of pushing the press switch 6 is also improved. Therefore, the object of this invention can be achieved.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A key module adapted to be mounted in a housing having a supporting surface, said key module comprising:
    a touch pad to be disposed above the supporting surface;
    a circuit board to be mounted between said touch pad and the supporting surface;
    a press switch coupled electrically to said circuit board, facing the supporting surface, and disposed at a position corresponding to the middle of said touch pad in a lengthwise direction; and
    a transmission member to be mounted between said circuit board and the supporting surface, and including two levers, and a press member that is disposed between said two levers and that abuts against said press switch, each of said levers having an effort arm, a resistance arm that connects said press member and said effort arm, and a fulcrum that is formed between said effort arm and said resistance arm and that abuts against the supporting surface;
    wherein when a portion of said touch pad that corresponds to said effort arm of one of said levers of said transmission member is pushed so as to exert a force on said effort arm, said resistance arm of said lever is acted by said fulcrum to shift toward said touch pad and bring said press member to abut against said press switch so as for the press switch to generate a corresponding electrical signal.

2. The key module as claimed in claim 1, further comprising a fixed plate and an adhesive layer, said fixed plate being connected to said circuit board by said adhesive layer, and being formed with a gap, said adhesive layer being formed with a notch, said press switch extending through said gap and said notch.

3. The key module as claimed in claim 1, wherein said resistance arm of each of said levers includes a flat segment and a first connecting segment, and said effort arm of each of said levers includes a second connecting segment and a force receiving segment, said flat segment being disposed flatly on the supporting surface, said first connecting segment connecting said flat segment and said press member, said second connecting segment connecting said flat segment and said force receiving segment, said first connecting segment and said second connecting segment extending respectively and inclinedly from two opposite ends of said flat segment in directions departing from the supporting surface such that said press member and said force receiving segment are spaced apart from the supporting surface and that said fulcrum is located at a junction between said flat segment and said second connecting segment.

4. The key module as claimed in claim 3, wherein said touch pad has a length designated as "L," and the distance between said press switch and said fulcrum of each of said levers is designated as "D," L and D having a relationship defined by L/3≥D≥L/≥L/4.

5. The key module as claimed in claim 3, wherein said transmission member is made of a bent resilient metal piece.

6. An electronic device comprising:
    a case including a housing and a cover body, said housing having a supporting surface; and
    a key module mounted in said housing and including
    a touch pad disposed above said supporting surface;
    a circuit board mounted between said touch pad and said supporting surface;
    a press switch coupled electrically to said circuit board, facing said supporting surface, and disposed at a position corresponding to the middle of said touch pad in a lengthwise direction; and
    a transmission member mounted between said circuit board and said supporting surface, and including two levers, and a press member that is disposed between said two levers and that abuts against said press switch, each of said levers having an effort arm, a resistance arm that connects said press member and said effort arm, and a fulcrum that is formed between said effort arm and said resistance arm and that abuts against said supporting surface;
    wherein when a portion of said touch pad that corresponds to said effort arm of one of said levers of said transmission member is pushed so as to exert a force on said effort arm, said resistance arm corresponding to said lever is acted by said fulcrum to shift toward said touch pad and bring said press member to abut against said press switch so as for said press switch to generate a corresponding electrical signal.

7. The electronic device as claimed in claim 6, wherein said key module further includes a fixed plate and an adhesive layer, said fixed plate being connected to said circuit board by said adhesive layer, and being formed with a gap, said adhesive layer being formed with a notch, said press switch extending through said gap and said notch.

8. The electronic device as claimed in claim 6, wherein said resistance arm of each of said levers includes a flat segment and a first connecting segment, and said effort arm of each of said levers includes a second connecting segment and a force receiving segment, said flat segment being disposed flatly on said supporting surface, said first connecting segment connecting said flat segment and said press member, said second connecting segment connecting said flat segment and said force receiving segment, said first connecting segment and said second connecting segment extending respectively and inclinedly from two opposite ends of said flat segment in directions departing from said supporting surface such that said press member and said force receiving segment are spaced apart from said supporting surface and that said fulcrum is located at a junction between said flat segment and said second connecting segment.

9. The electronic device as claimed in claim 8, wherein said touch pad has a length designated as "L," and the distance between said press switch and said fulcrum of each of said levers is designated as "D," L and D having a relationship defined by $L/3 \geq D \geq L/4$.

10. The electronic device as claimed in claim 8, wherein said transmission member is made of a bent resilient metal piece.

* * * * *